United States Patent
Caudill

(10) Patent No.: US 12,242,581 B2
(45) Date of Patent: Mar. 4, 2025

(54) OCCUPATIONAL SAFETY SUPPORT SYSTEM

(71) Applicant: Wesley Caudill, Augusta, CA (US)

(72) Inventor: Wesley Caudill, Augusta, CA (US)

( * ) Notice: Subject to any disclaimer, the term of this patent is extended or adjusted under 35 U.S.C. 154(b) by 0 days.

(21) Appl. No.: 18/092,359

(22) Filed: Jan. 2, 2023

(65) Prior Publication Data

US 2023/0350991 A1    Nov. 2, 2023

Related U.S. Application Data

(60) Provisional application No. 63/296,039, filed on Jan. 3, 2022.

(51) Int. Cl.
| | |
|---|---|
| *G06F 21/32* | (2013.01) |
| *G06F 3/04886* | (2022.01) |
| *G06V 40/13* | (2022.01) |
| *G06F 3/0485* | (2022.01) |

(52) U.S. Cl.
CPC .......... *G06F 21/32* (2013.01); *G06F 3/04886* (2013.01); *G06V 40/13* (2022.01); *G06F 3/0485* (2013.01)

(58) Field of Classification Search
CPC .... G06F 21/32; G06F 3/04886; G06F 3/0485; G06V 40/13
See application file for complete search history.

(56) References Cited

U.S. PATENT DOCUMENTS

| | | | |
|---|---|---|---|
| 2012/0285587 A1* | 11/2012 | Schiffman ............ | A45C 13/008 150/154 |
| 2022/0284254 A1* | 9/2022 | Sprague ........... | G06K 19/07762 |
| 2022/0319659 A1* | 10/2022 | Lafauci .................. | G16H 20/13 |

FOREIGN PATENT DOCUMENTS

WO    PCT/US20/41257    *   7/2020    ............. G16H 20/13

* cited by examiner

*Primary Examiner* — Jonathan A Boyd
(74) *Attorney, Agent, or Firm* — The Rapacke Law Group; Andrew Rapacke

(57) ABSTRACT

The invention is a job-safety support system, worn by its user by its necklace appendage, and provides confirmation that the user is authorized to perform an assigned task, and that the user has reviewed the job-safety-related proscriptions and processes prior to attempting to perform the task. A badge wearer who is not authorized to perform a task will not be given the associated proscriptions and processes, and instead, the badge would convey that personalization data to a central system that would discontinue further action and issue an alert to supervisory personnel. Where a user is authorized to perform a task, the user can review related proscriptions and processes and affirm readiness to perform the task. All confirmations are date and time stamped for any later review in the case of any mishaps.

20 Claims, 6 Drawing Sheets

OCCUPATIONAL SAFETY SUPPORT SYSTEM

CROSS-REFERENCE TO RELATED APPLICATIONS

The present application claims priority to U.S. Provisional Patent Application No. 63/296,039 filed Jan. 3, 2021, entitled "SAFETY AND PROCEDURE BADGE" which is hereby incorporated by reference in its entirety.

TECHNICAL FIELD

The invention system is a self-contained, wearable device that supports occupational job safety proscriptions and procedures.

BACKGROUND

There are many job-related tasks that may have inherent dangers and require proscribed actions and processes associated with them to help insure occupational safety.

Where accidents occur, and workers are injured or killed, there is typically follow up investigations and reports to determine whether employees were adequately trained and prepared to the assigned tasks.

From a liability perspective, if a company is found to have not adequately trained or monitored the carrying out of a task vulnerable to life-threatening aspects, the company may be liable for civil and, perhaps, criminal penalties.

A support system that ensures that employees trained and authorized to perform certain tasks have carried them out, and where such employees have completed a preparation check list prior to performing the tasks required, may significantly reduce both the incidence of occupational mishaps and the company's liability in such cases, as well.

SUMMARY OF THE INVENTION SYSTEM

The invention system herein disclosed is a wearable device attached to a necklace that enables wearing it around one's neck and having it be conveniently suspended and placed outside any protective clothing.

The invention is badge-shaped and features an electronic display, status-indicating structures, and control structures. A used would be issued such a badge and insert a personalization device into it, or be unalterably programmed with such personalization data. The personalized badge, then, can be associated by its user with an impending task and using the personalization data and records stored in a central system, determine if that employee is trained and authorized to carry out the associated impending task.

If the user is so authorized, the central system will then download to the badge a list of safety-related proscriptions and processes which the employee, in turn, can slowly scroll through and assert using control structures that employee's familiarity with the proscribed steps. As each step is reviewed and confirmed, a status-indicating structure will have its state changed to show that confirmation. In addition, as each step is confirmed, the date and time of confirmation is captured and stored on the badge as well as transmitted via wireless communications means to the central system.

Later, if a mishap has occurred, the record of authorization to carry out the task as well as the employee's assertion of readiness, as provided by the badge data, provides significant support that safety processes have been followed.

DETAILED DESCRIPTION

The invention system, exemplified in one of a variety of embodiments, is meant to support a user's authorization to carry out a occupational task, safely, by making sure the employee is authorized to carry out the assigned task, and having the employee affirm a review of task-related proscriptions and processes intended to ensure occupational safety.

It is a self-contained system, that appears like a necklace suspended badge, and provides a display screen, status-indicating structures and control structures. In addition, it provides wireless communications of badge data to a central system for a record of authorization and affirmation of proscription and process review prior to carrying out the task.

The badge is non-person-specific, but when a personalization device, analogous to a SIM card in a smartphone, is inserted, the badge becomes associated with that person's unique identification and background as contained in a central system.

If the badge wearer is not authorized to carry out a required operation, the central system will not forward a list of proscriptions and processes for review and affirmation, and instead, it will discontinue any further operation other than alerting supervisory personnel.

Figure 1:
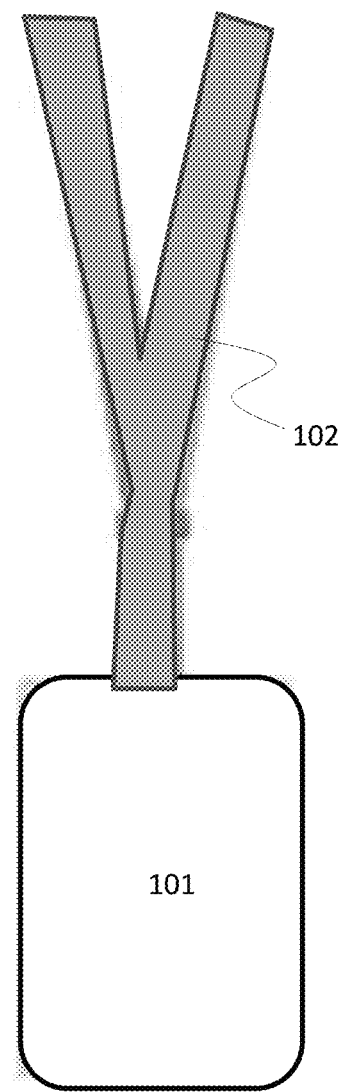
FIG. 1 show an embodiment of the wearable safety-support system attached to a necklace.

Looking at FIG. 1, the badge 101 is attached to a necklace 102 so it can worn around the neck and suspended in a convenient place outside of any protective garments.

Figure 2:
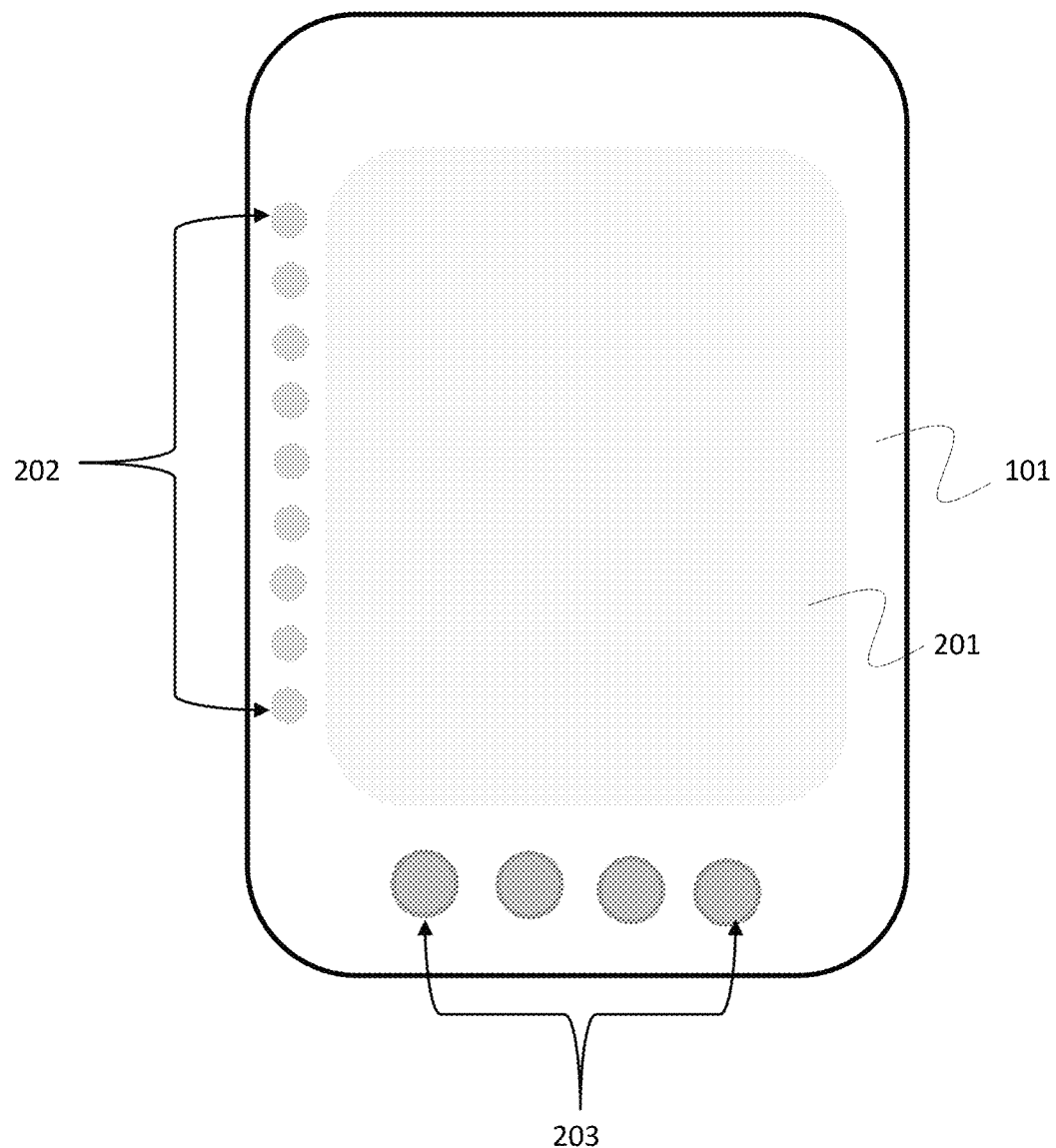
FIG. 2 shows an embodiment of the safety-supporting badge showing its display screen, status-indication structures and control structures. Here, the status-indicating and control structures are discrete components separate from the display screen.

FIG. 2 shows one embodiment of the badge 101 wherein the status-indicating structures 201 and control structures 202 are discrete devices external to the display screen.

Figure 3:
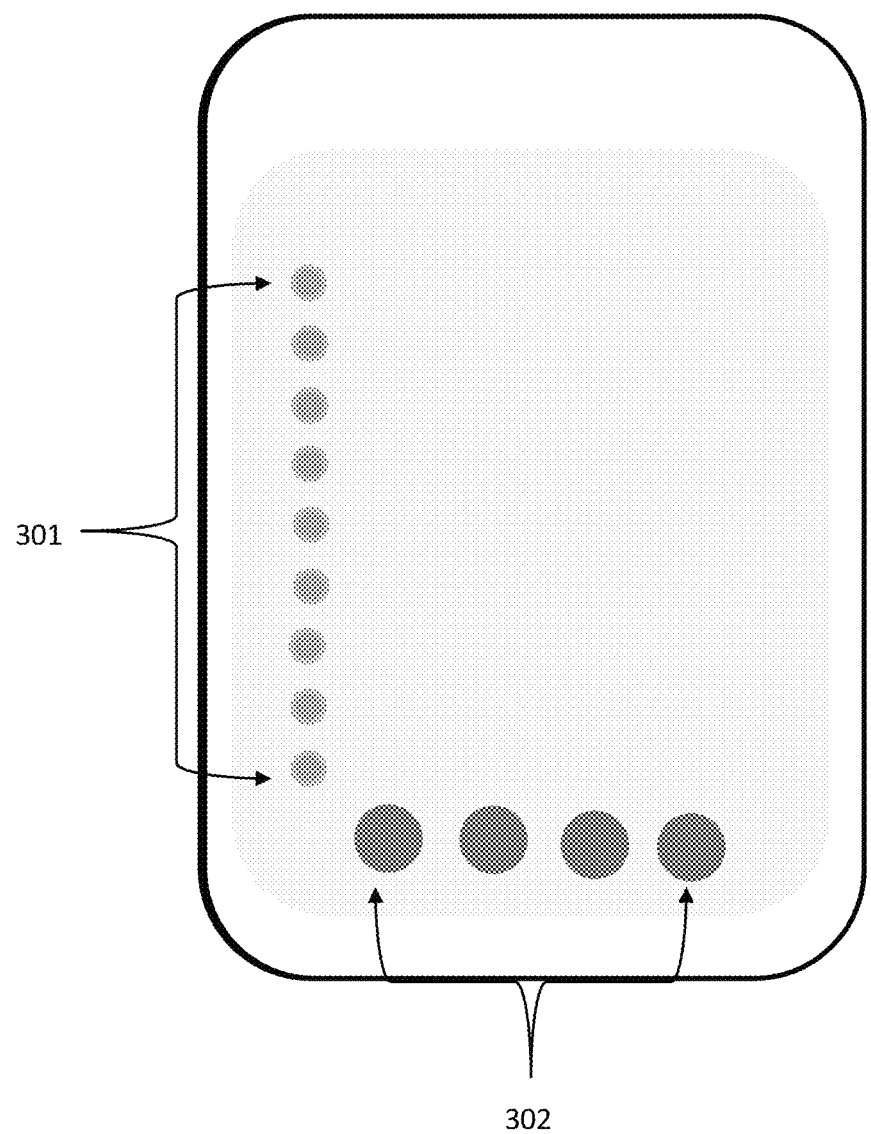
FIG. 3 shows another embodiment wherein the display screen is a touch-screen in which the status-indicating and control structures are selected, pixelated areas on the display screen that are invoked by touching those selected, pixelated areas.

FIG. 3 shows another embodiment of the badge wherein the display screen is a touch screen and the status-indicating structures 201 and control structures 202 are part of the display and are deployed when touched.

Figure 4:
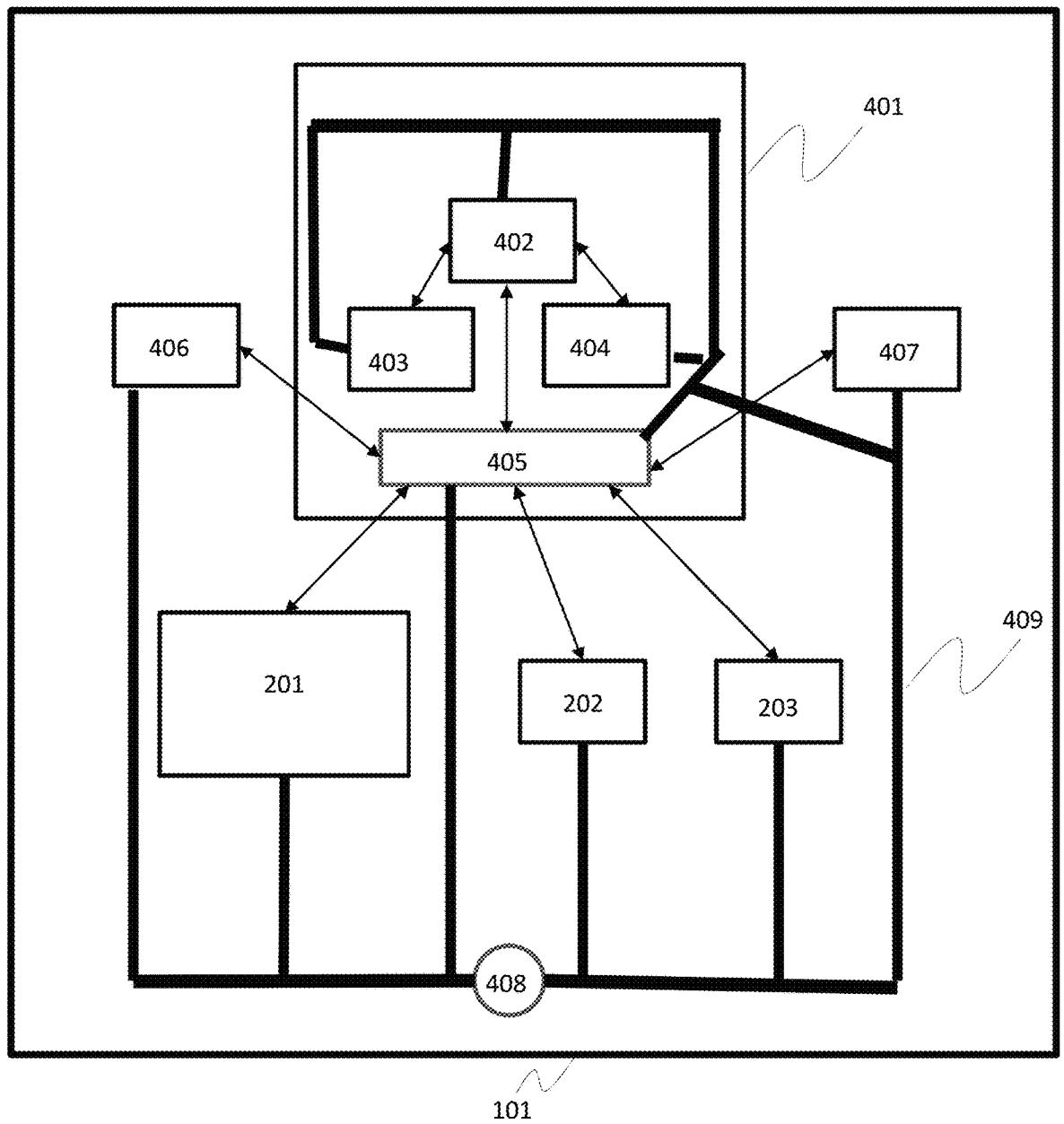
FIG. 4 is a block diagram showing an embodiment of the badge and the functional blocks of which it is comprised. In it, the discrete status-indicating and control structures are shown as separate from the display screen.

FIG. 4 shows an embodiment of the badge and its subsystems wherein the badge 101 comprises a microcontroller 401, which in turn comprises a central processor 402, program memory 403, data memory 404 and input-output subsystem 405. If further comprises a personalization subsystem 406 comprising an external slot and internal connector, and wireless communications subsystem 407, as well as the display screen 201, status-indicating structures 202 and control structures 203. The entire system is powered by a battery 408 and a power bus connecting all subsystems to the battery.

Figure 5:
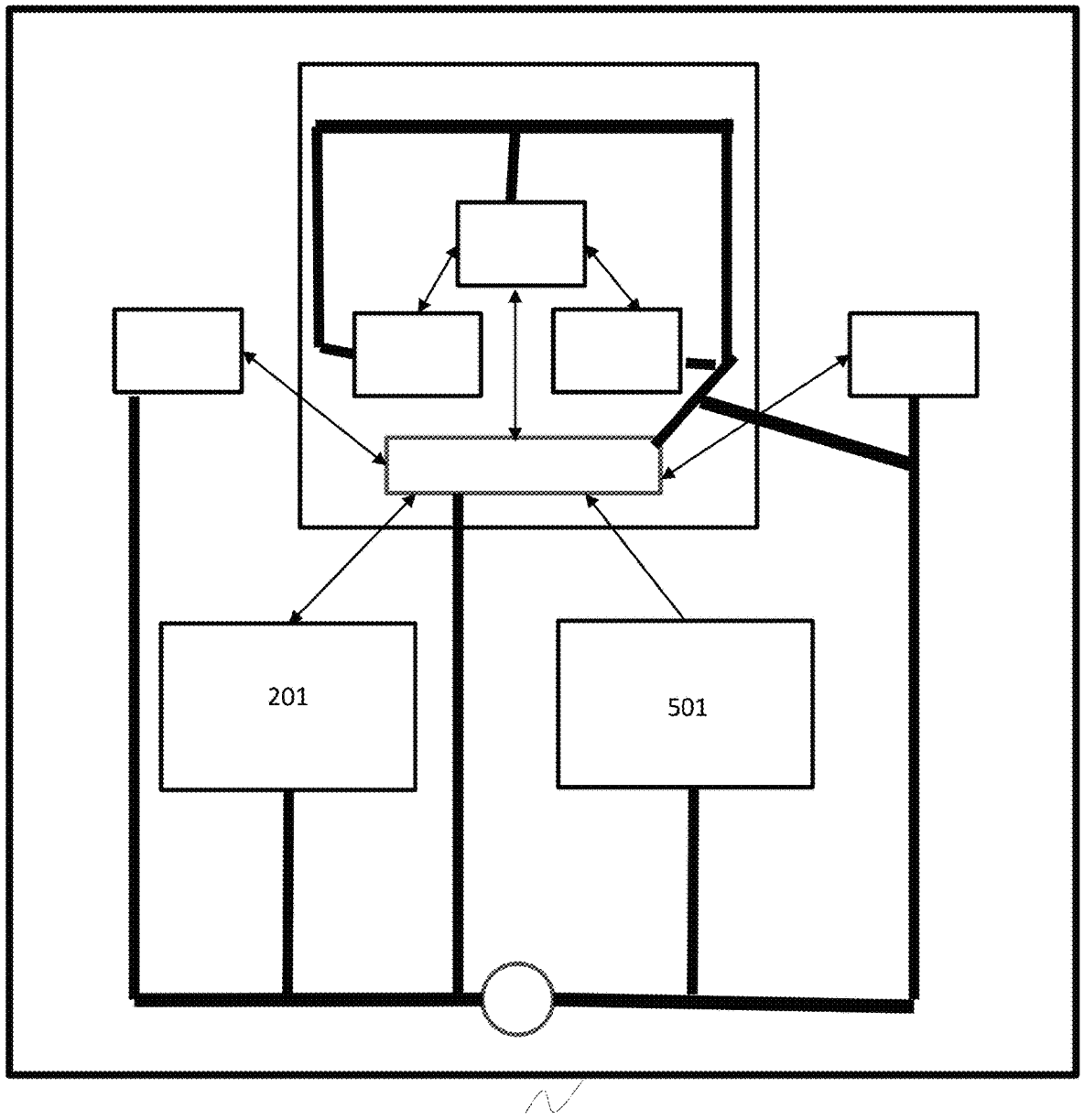
FIG. 5 is a different embodiment of the badge in which the display screen is a touch-screen and in lieu or discrete status-indicating and control structures, these are implemented as iconic, pixelated regions on the screen that may be invoked by touching the screen in those areas.

In FIG. 5, the display screen 201 is now a touch screen and incorporates the discrete structures shown in FIG. 4 implemented on the touch screen. In addition, a finger-print detector 501 permits the invention to prevent use by anyone other than the person whose fingerprint is stored in the system.

Figure 6:
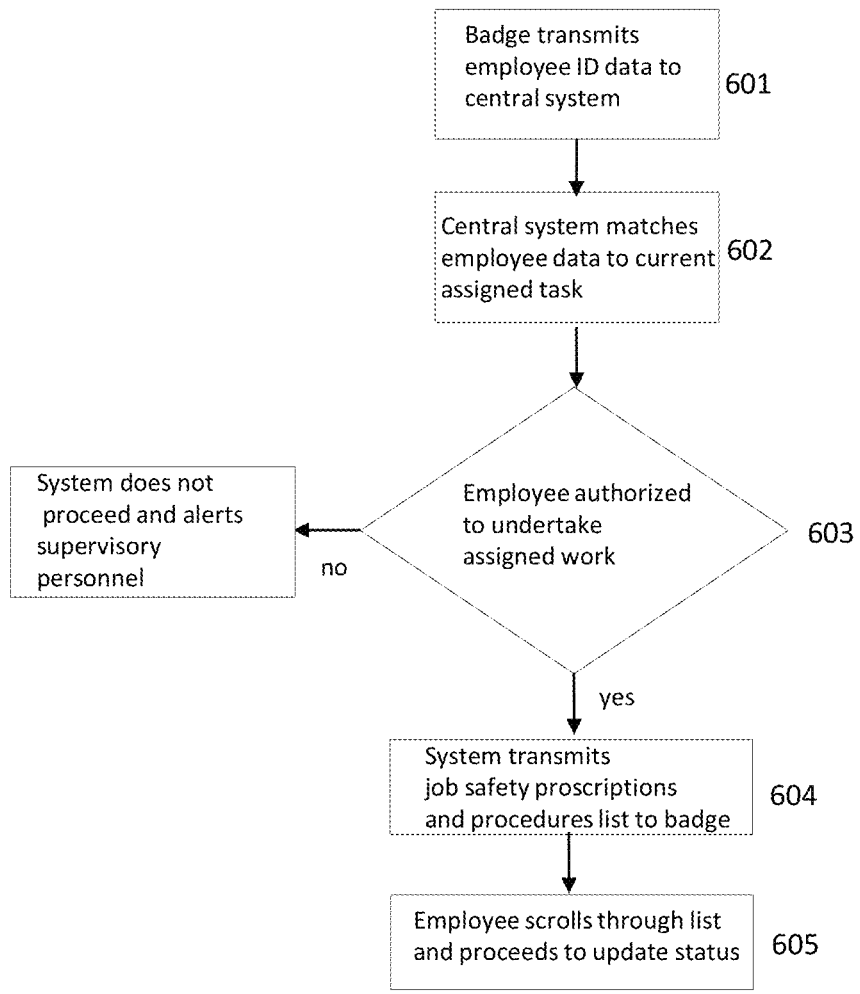
FIG. 6 is a flow diagram that illustrates an exemplary flow beginning with the disseminating of a user's unique identification and classification data and proceeding with confirmation of authorization to perform the work as well as confirmation of job-related proscriptions and processes associated with performing the work safely.

Finally, FIG. 6 depicts an exemplary method of us wherein the badge transmits the user's personalization data to the central system 601, the central system compares the personalized data to job-required authorizations 602. If the comparison shows that the user is authorized to the perform the associated task 603, the central system transmits job-safety-related proscriptions and process list to the badge 604. If the user is not authorized, the central system will issue an alert and advise supervisory personnel. Once authorization is determined, and the list conveyed from central system to the badge, the user can then step through the listed items, confirming having knowledge related to each listed item, and as each line item is confirmed, its status-indicating device will be updated. All the updated confirmations are then transmitted to the central system by the badge, having been appended with date and time, and become part of the record related to the assigned task and any mishaps that may have occurred.

As an example, to further illustrate how the invention is deployed and used, an employee who has been assigned to a task would, perhaps, be prompted to affirm a task ID that appears on the badge once the user's badge has conveyed the personalization data to the central system.

Once the user has affirmed the assigned task identification, the central system will, based on personalization data, determine is that user is authorized to perform the task. If so, the central system will convey to the badge a line-itemed list of proscriptions and processes that need to be reviewed and affirmed before carrying out the task.

The line-itemed list is aligned with status-indicating structures, either one on the side of a display screen, or ones displayed on a touch-screen display. As the user slowly scrolls through the line items, the user will then affirm each one using a control structure (e.g. a button) either below the display screen or displayed on a touch-screen display.

As each line item is affirmed, the status-indicating structure will show a change in status. If the status-indicating structure is an LED lamp, it will illuminate, or, perhaps change color from red to green. If the status-indicating structure is a box on the touch-screen display, once the line item is affirmed, the box may be filled (e.g. its fill color changes from white to black), or a checkmark is inserted inside the box.

As each line item is affirmed, the date and time and affirmation is conveyed to the central system and is stored as a record. Thus, it will be available as evidence that a badge user has affirmed all of the proscriptions and processes associated with a task prior to performing that task. A failure to affirm the line items would result in a badge message that permission to proceed is pending full affirmation and, perhaps, a message to supervisory personnel that a task is pending, as well.

The Occupational Safety and Health Administration (OSHA) has a procedure called "lock out, tag out." Lock out, tag (LOTO) is used to ensure that dangerous equipment is properly shut off, or tagged, and is not to be restarted before maintenance or repair work is completed. Equipment subject to LOTO has some source of energy that is considered dangerous. It may be electrical, hydraulic, steam, combustible gas, or the like. The isolated power sources are then locked, if possible, and a tag is placed on the lock, or equipment, identifying the worker and reason the LOTO is placed on it. The worker then holds the key for the lock, ensuring that only they can remove the lock and start the equipment. This prevents accidental startup of equipment while it is in a hazardous state or while a worker is in direct contact with it.

LOTO uses a lock as the first-order protection means, and requires that one, and only one key be available to remove the lock. Where a system does not lend itself to a padlocked energy-source control, the tag, alone, becomes a second-order protection means.

The invention is very suited to supporting the safety aspects of a LOTO-related task. For example, it uses the affirmation process to determine if the user is qualified to repair and restart a LOTO-locked system. Only then will it authorize securing the key from the person who previously locked and tagged the system. Or, it may support the LOGO step, itself, wherein the person locking and securing the key first must affirm a line-item set of proscriptions and processes before locking and tagging.

From a company perspective, making use of the invention badge helps indemnify the company from liability for a mishap wherein the badge user has been qualified as having the proper authorization, and the user has affirmed the proscriptions and processes conveyed to the badge by the central system. It is analogous to the terms-and-conditions one must sign off on before a transaction is allowed to proceed on many transactional websites. The act of signing makes the assumption that the signer has read and understands the terms and conditions. It is so stated on the signature page. In a similar way, the act of review and affirmation of the line items listed on the badge, having been conveyed by the central system, makes the assumption that the badge user has read and understood the proscriptions and processes.

The figures included herein are meant to be exemplary and should not be read as limiting the scope of the invention. Personalization data could also be conveyed to the device, wirelessly, rather than using a personalization card or chip inserted into the device. The battery could be a replaceable button cell easily removed and/or inserted from the side of back of the badge without requiring any disassembly. Although the control subsystem shows discrete processor, memories and input-output subsystems, these may be integrated into a single integrated-circuit device.

The encasement of the badge is intended to protect it from gases, vapors, heat and radiation as may be found in work-related environments. The encasement is operative to allow unimpeded operation at up to 150 degrees Fahrenheit, and the encasement is operative to allow immersion in water up to a depth of 100 feet without operational failure. Low-battery condition would be shown and operation would be suspended until battery replaced or in the case of rechargeable batteries, the battery is recharged.

What is claimed is:

1. A system for supporting occupational safety comprising:
   a rectangular, low-profile, badge;
   the rectangular, low-profile badge is operative to attach to a necklace enabling wearing the rectangular, low-profile badge around a person's neck and suspended exterior to protective clothing;
   the rectangular, low-profile badge comprises: a touch screen;
   status-indicating structures;
   control structures;
   internal battery;
   one or more electronic subsystems;
   one or more wireless communications subsystems; and
   a slot and internal receptacle operative to accept a compatible personalization device,
   wherein the rectangular, low-profile badge is configured to:
      change a status of an individual job-safety proscription and procedure in response to a detection of a selection of a status-change structure located on the rectangular, low-profile badge; and
      record date and time of the change of the status for each job-safety proscription and procedure.

2. The system as in claim 1 wherein:
   the rectangular, low-profile badge is operative to protect all external and internal structures and subsystems from hazardous external materials.

3. The system as in claim 1 wherein:
   the rectangular, low-profile badge is operative to protect all external and internal structures and subsystems from temperatures of up to 150 degrees Fahrenheit.

4. The system as in claim 1 wherein:
   the rectangular, low-profile badge is operative to protect all external and internal structures and subsystems from submersion in water to a depth of 100 feet.

5. The system as in claim 1 wherein:
   the one or more electronic subsystems comprise: a microcontroller;
   a program memory;
   a data memory; and
   an input-output interface.

6. The system as in claim 1 wherein:
   the one or more wireless communications subsystems are operative to support transmission and reception across wide-area and local-area wireless-network infrastructure.

7. The system as in claim 1 wherein: status-indicating structures comprise:
   multiple, individual, light-emitting diodes.

8. The system as in claim 1 wherein: control structures comprise:
   multiple, individual, momentary on-off pushbutton switches.

9. The system as in claim 1 wherein:
   the internal battery is a button cell operative to be easily inserted and replaced without badge disassembly.

10. The system as in claim 1 wherein:
    the compatible personalization device is operative to be a non-volatile, write once device with information comprising:
    first and last name;
    unique employee identification number; and scope of authorization.

11. The system as in claim 1 wherein:
    the status-indicating structures are select, pixelated structures, that are displayed comprising: square boxes filled with white or block indicative of a change in status.

12. The system as in claim 1 wherein:
    the status-indicating structures are select, pixelated structures, that are displayed comprising: square boxes that are either empty or have a check mark within indicative of a change in status.

13. The system as in claim 1 wherein:
    control structures are select, pixelated structures, that are displayed, and operative to change on and off state alternately each time the area is touched.

14. The system as in claim 1 wherein:
    the internal battery may be non-removable and rechargeable using induction means.

15. The system as in claim 1 further comprising:
    a finger-print detector operative to detect a finger's print and compare it to a stored reference print.

16. The method of use for the system of claim 1 comprising:
    scrolling through a set of job-safety proscriptions and procedures, as displayed by a rectangular, low-profile badge, by repeatedly selecting a scroll-control structure;
    changing the status of an individual job-safety proscription and procedure, by selecting a status-change structure, located on the rectangular, low-profile badge; and
    recording date and time, by a rectangular, low-profile badge, of change of status for each job-safety proscription and procedure.

17. The method of use as in claim 16 further comprising:
    touching finger-print detector on the rectangular, low-profile badge;
    enabling, upon match of detected finger print with stored finger print, the operation of the rectangular, low-profile badge.

18. The method of use as claim 17 further comprising:
    preventing operation of the rectangular, low-profile badge if finger print detected does not match stored print; and
    storing date and time of finger-print detection attempt and operational prevention.

19. The method of use as in claim 16 further comprising:
    transmitting via wireless communications subsystem of the rectangular, low-profile badge the date, time and status of each job-safety proscription and procedure to a central system for storage and retention.

20. The method of use as in claim 18 further comprising:
    transmitting via the wireless communications subsystem of the rectangular, low-profile badge the date, time and actions precipitated by the failure of finger-print match;
    alerting system administrator of finger-print match failure; and
    preventing assigned task associated with that use of the rectangular, low-profile badge pending a subsequent finger-print match.

* * * * *